United States Patent [19]

Burchette et al.

[11] Patent Number: 5,004,402
[45] Date of Patent: Apr. 2, 1991

[54] AXIAL COMPRESSOR STATOR CONSTRUCTION

[75] Inventors: Herbert L. Burchette, West Palm Beach; Lee E. Hansen, Lake Park; James C. West, West Palm Beach, all of Fla.; Glen A. Nawrocki, Phoenix, Ariz.

[73] Assignee: United Technologies Corporation, Hartford, Conn.

[21] Appl. No.: 402,744

[22] Filed: Sep. 5, 1989

[51] Int. Cl.$^5$ .................... F28F 7/00; F01D 9/00
[52] U.S. Cl. .................... 415/137; 415/138; 415/200; 415/209.2; 415/209.3
[58] Field of Search ............... 415/208.1, 208.2, 209.1, 415/209.2, 209.3, 220, 199.5, 200, 173.4, 173.5, 173.6, 173.7, 182.1, 115, 116, 117, 108, 173.1, 173.2, 173.3, 130, 136, 170.1, 137, 138, 139

[56] References Cited

U.S. PATENT DOCUMENTS

| | | | |
|---|---|---|---|
| 2,982,519 | 5/1961 | Haworth et al. | 415/209.1 |
| 3,056,583 | 10/1962 | Varadi et al. | 415/209.2 |
| 3,070,353 | 12/1962 | Welsh | 415/209.2 |
| 3,295,751 | 1/1967 | Sceggel | 230/133 |
| 3,375,971 | 4/1968 | Fitton | 415/209.1 |
| 3,561,884 | 2/1971 | Zerlauth | 415/209.1 |
| 3,583,824 | 6/1971 | Smoland | 415/173.1 |
| 4,101,292 | 7/1978 | Coplin et al. | 415/208.2 |
| 4,155,680 | 5/1979 | Linko, III et al. | 415/121.2 |
| 4,425,078 | 1/1984 | Robbins | 415/138 |
| 4,426,191 | 1/1984 | Brodell et al. | 415/189 |
| 4,573,866 | 3/1986 | Sandy, Jr. et al. | 415/116 |
| 4,573,867 | 3/1986 | Hand | 415/209.1 |
| 4,786,232 | 11/1988 | Davis et al. | 415/138 |
| 4,820,124 | 4/1989 | Fried | 416/191 |

Primary Examiner—Edward K. Look
Assistant Examiner—Hoang Nguyen
Attorney, Agent, or Firm—Edward L. Kochey, Jr.

[57] ABSTRACT

A split casing (10) of low, coefficient of expansion material, has internal upstream facing slots (12). A semicircular shroud ring (16), of high coefficient of expansion material, carries the vanes (18), and has a tongue (20) sliding within casing slot (12). Casing stop lugs (14) and shroud stop lugs (22) have mutually abuttable surfaces (70,72) to antirotate the shroud within the casing. The distance between abuttable surfaces of the casing is greater than the distance between abuttable surfaces of the shroud ring at room temperature, but the distance are the same at the long time operating temperature.

10 Claims, 2 Drawing Sheets

AXIAL COMPRESSOR STATOR CONSTRUCTION

TECHNICAL FIELD

The invention relates to axial compressors with a split casing, and in particular to stator vanes therein.

BACKGROUND

In an axial flow compressor, an axially split compressor case offers several advantages. The case can be installed around an inertia welded rotor and it also facilitates maintenance operations such as changing blades and vanes.

The axial split, however, requires that all rings inside the case be cut into pieces of 180 degrees or less. This requires that various new ways be found to fit the parts together For example, diametral tight fits cannot be used because segmented parts have no hoop strength.

Because of the aerodynamics of compressing air, the higher stages of the compressor operate at elevated temperatures on the order of 600° centigrade. In aircraft where low weight is important, the casing is normally made of titanium which is of light weight. On the other hand the vanes and stator shrouds are usually made of nickel because of its higher strength Titanium has a low alpha (which is its coefficient of expansion) while nickel has a high alpha. Therefore, even when both are raised to an identical temperature, the nickel expands more than the titanium. Provision must be made to tolerate the differential expansion between the nickel vanes and shroud, and the titanium case to which they are secured.

Provisions must also be made to anti-rotate the vanes, this not being a significant problem in compressors which may use diametral tight fits.

In the interest of efficiency of the compressor it is desirable to prevent recirculation of air from the higher stages to the lower stages.

The vanes should be easily removable for maintenance and it is important to locate these vanes accurately in the axial direction to avoid interference with the adjacent rotating blades.

SUMMARY OF THE INVENTION

Each semicircular split half of the compressor casing is formed of a low coefficient of expansion material and has an internal slot running circumferentially, extending axially, and facing upstream. There also are on the casing a plurality of circumferentially spaced, inwardly radially extending, casing stop lugs. A semicircular shroud ring of a second, higher coefficient expansion, material has a plurality of stator vanes secured thereto. A circumferentially running tongue on the shroud is slideably fit within the casing slot. The shroud has a plurality of circumferentially spaced, outwardly radially extending, shroud stop lugs. These are splined with the casing stop lugs.

These lugs have mutually abuttable surfaces. The distance between abuttable surfaces of the casing lugs is greater than the distance between the abuttable surfaces of the shroud lugs when the units are at room temperature. These distances are, however, equal when the casing is at a preselected operating temperature, this temperature being that of the long term normal operating condition of the compressor.

Additional shroud rings are similarly arranged and also have protrusions which are slideably fit within additional slots in the preceding shroud ring. A lock ring in the form of a tip shroud is provided which slides within oppositely facing slots within the casing, and which also abuts earlier installed shroud rings to maintain these rings in place.

DESCRIPTION OF THE PREFERRED EMBODIMENT

Figure 1:
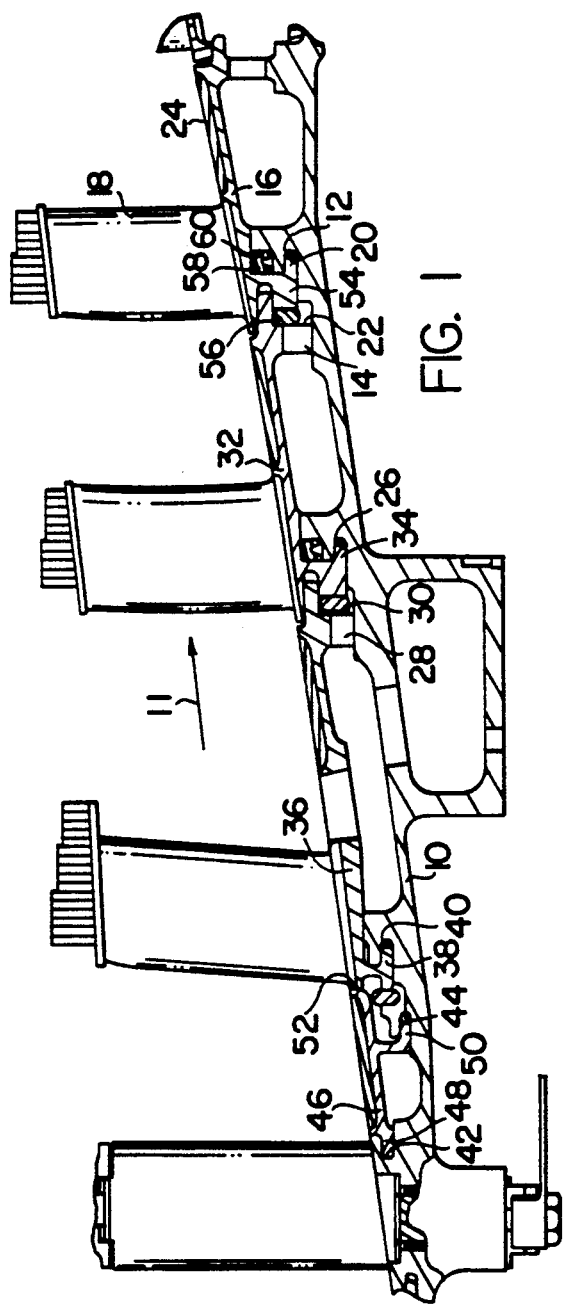
FIG. 1 is a sectional side elevation of the stator through several stages.

A semicircular split casing section 10 is axially tapered and formed of a low alpha (coefficient of expansion) material such as titanium. Airflow thru the compressor is in the direction shown by arrow 11, the left side of FIG. 1 therefore being the upstream end. Casing slot 12 is circumferentially running, axially extending and upstream facing. Also formed on the casing is a plurality of circumferentially spaced inwardly radially extending casing stop lugs 14. A semicircular shroud ring 16 is formed of nickel which is a higher alpha material than the titanium. A plurality of stator vanes 18 are positioned thereon.

A circumferentially running axially extending shroud tongue 20 is slideably fit within casing slot 12. A plurality of circumferentially spaced, outwardly radially extending, shroud stop lugs 22 are splined with the casing stop lugs 14. An abradable material 24 is located adjacent the tips of the rotor blades (not shown).

The casing section includes a second circumferentially running, axially extending, upstream facing casing slot 26. This slot is located upstream of casing slot 12. The casing section also has a plurality of second casing stop lugs 28 which are splined with second shroud stop lugs 30. The second nickel shroud ring 32 has a second tongue 34 slideably fit within casing slot 26. Similarly, an additional shroud ring 36 is installed with tongue 38 being slideably engaged with slot 40.

The casing also has at a further upstream location, a downstream facing slot 42 and an upstream facing slot 44. A locking ring 46 in the form of a seventh stage tip shroud has tongues 48 and 50 slideable within slots 42 and 44 respectively. An abutment surface 52 on the locking ring abuts one end of shroud 36 to retain it in place.

Figure 2:
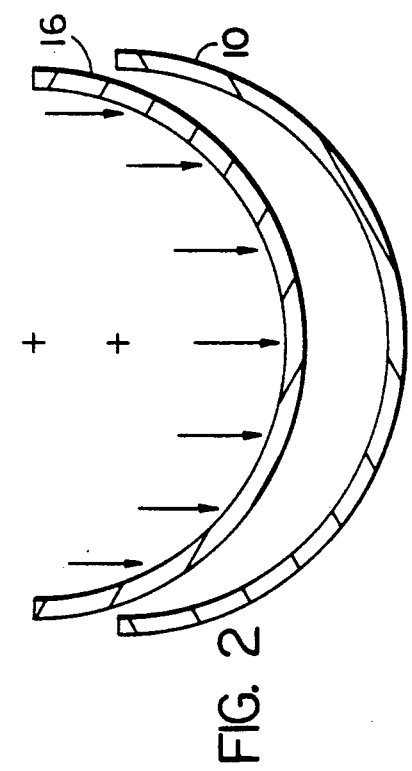
FIG. 2 is a sectional view showing installation of stator segments.

FIG. 2 schematically illustrates the insertion of shroud ring 16 within casing section 10. The ring is moved radially in the direction illustrated in the figure at a location slightly upstream of its final position. It is then slid rearward into the axially tapered casing with tongue 20 locking within slot 12. Feet 54 forming the tongue 20, are segmented so that they may pass between the various stop lugs 14 during installation. A wire retainer 56 is placed between the stop lugs and the feet to temporarily retain the shroud in position.

A "W" seal 58 is located under the shroud between the shroud and the casing in crevice 60. The interaction of tongue 20 and slot 12 (or the surface immediately above this) prevents excessive rearward movement of the shroud which would overcompress the "W" seal. The shrouds 32 and 36 are installed in a like manner.

Figure 3:
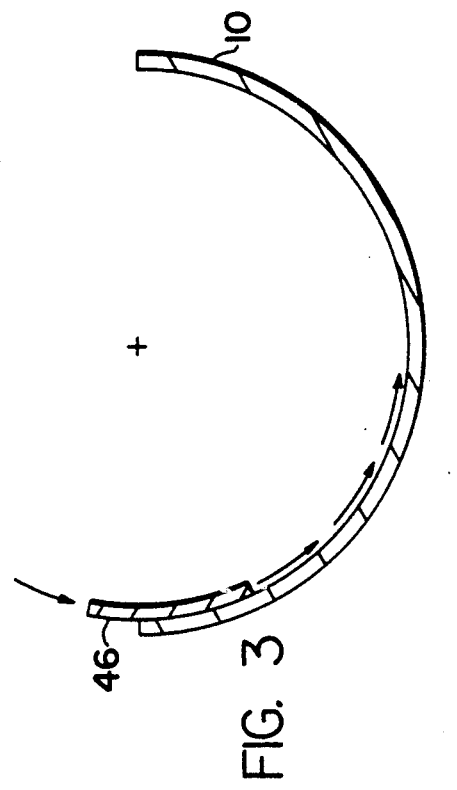
FIG. 3 is a sectional view showing installation of the locking ring.

Referring to FIG. 3 the lock ring 46 is slid circumferentially with the tongues fitting within the slots. This final installation locks in place the shrouds which were earlier installed.

Figure 4:
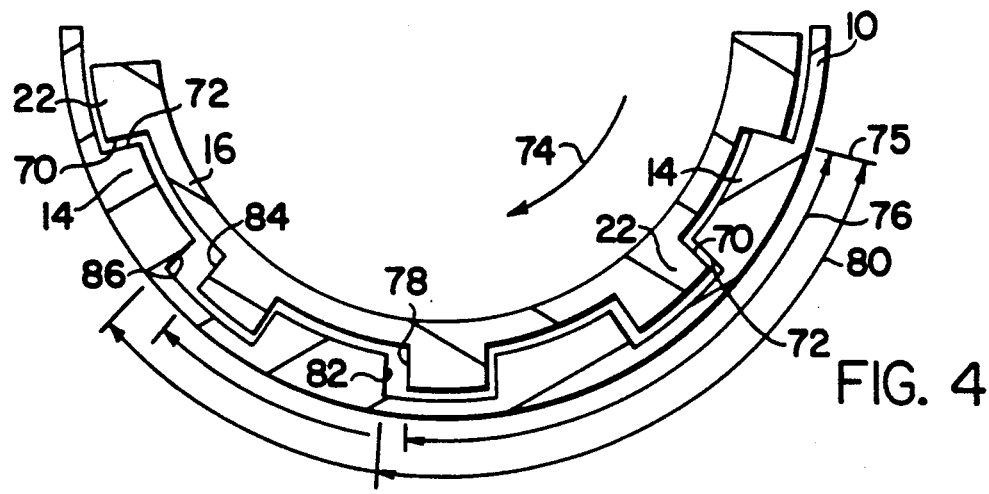
FIG. 4 shows the anti-rotation lugs at low temperature.
Figure 5:
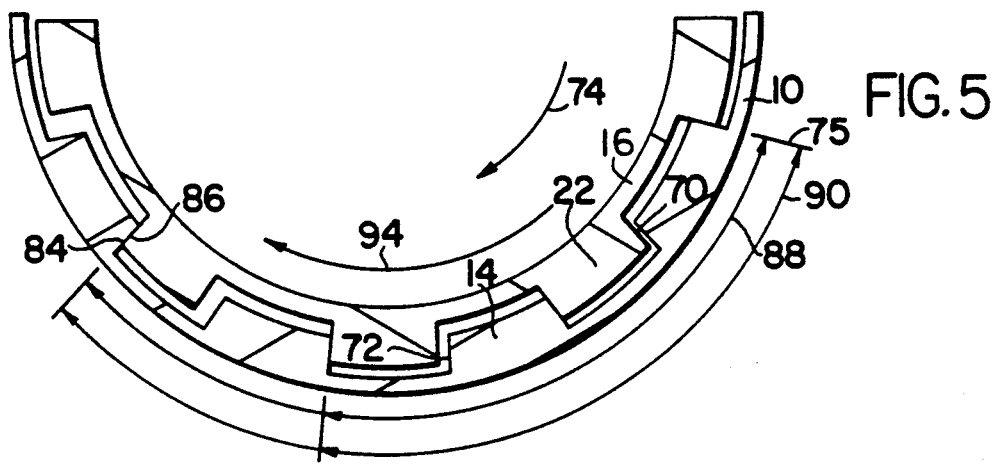
FIG. 5 shows the anti-rotation lugs at high temperature.
Figure 6:
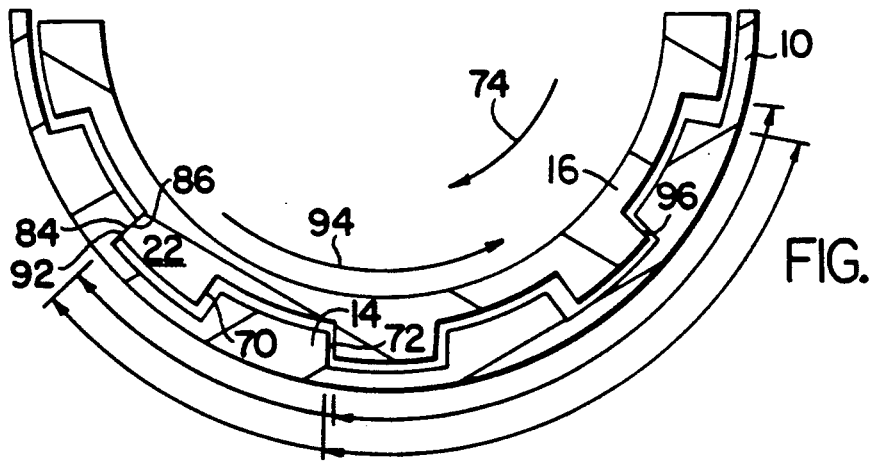
FIG. 6 shows the anti-rotation lugs at very high temperature.

Referring to FIGS. 4, 5 and 6 shroud stop lugs 22 have abuttable surfaces 70. The casing stop lugs 14 have abuttable surfaces 72. The overall surface of the nickel stator in a titanium case has a copper nickel coating on the surface for the purpose of providing a soft bearing surface which spreads the wear over the surface. This includes the area of the abutting surfaces and it can be appreciated, that to the extent that wear is concentrated on one of the pairs of abutting surfaces, early loss of the copper nickel coating can be expected.

Air load represented as 74 tends to rotate the shroud in the indicated direction. The purpose of the stop lugs is to anti-rotate the shroud 16 within casing 10 by abutment of the mutually abuttable surfaces.

Differential expansion between the shroud and the casing will cause the nickel stator of high alpha material to expand more than the titanium case which is low alpha material. In a conventional design there would be a diametric compression of the stator and expansion of the case because of the diametral strain between the two. In this design, however, the two are retained by the tongues interacting with the slots. Accordingly, rather than expanding radially outwardly the stator tends to slide circumferentially within the case.

This causes a reorientation of the stop lugs with respect to one another. The lugs are spaced so that at the high time point operating condition of the engine (for instance 0.9 Mach at sea level) all abutting surfaces are in contact. This therefore achieves optimum distribution of load and minimization of concentrated wear.

FIG. 4 represents the cold or as formed condition at room temperature. Line 75 represents the abutting surfaces in the area of both the casing and shroud lug. It can be seen that the distance through arc 76 to abutting surface 78 is less than arc 80 to abutting surface 82. A similar arrangement exists between abutting surfaces 84 and 86, respectively.

As the shroud and the casing reach the high time point or the hot condition, both elements expand. The high alpha material stator, however, expands more than the low alpha casing so that in FIG. 5 the arcuate dimension 88 between abutting surfaces 75 and 84 equals the arcuate distance 90 between abutting surfaces 75 and 86.

FIG. 6 illustrates the low time point at very hot operation, where the differential expansion is greater than that of FIG. 5. In such a case abutment surfaces 86 and 84 are in contact at location 92. The relative movement of the stator shroud is as indicated by arrow 94 and it is noted that clearance at location 96 is required to accept such growth.

It can therefore be seen by the proper defined spacing of the abuttment surfaces of the lugs, the uniform well distributed loading of FIG. 5 can be accomplished for the gross majority of the operation.

The invention has been described in terms of semicircular shroud rings. It is, however, equally applicable to segments of less than 180 degrees. The term partial circular is used herein to generically denote semicircular or less.

We claim:

1. A stator construction for an axially split casing compressor comprising:
   an axially tapered semicircular casing section of low alpha material having, a circumferentially running axially extending upstream facing casing slot, a plurality of circumferentially spaced inwardly radially extending casing stop lugs;
   a partial circular shroud ring of a second higher alpha material in which a plurality of stator vanes are positioned, and a circumferentially running axially extending shroud tongue slideably fit within said casing slot for circumferentially guiding movement of said shroud ring relative to said casing during thermal expansion, and a plurality of circumferentially spaced outwardly radially extending shroud stop lugs, splined with said casing stop lugs;
   said casing stop lugs and said shroud stop lugs having mutually abuttable surfaces, the distance between abuttable surfaces of said casing lugs being greater than the distance between abuttable surfaces of said shroud lugs at room temperature, and with only one shroud stop lug of said partial circular shroud ring in contact with a casing stop lug as installed at room temperature; and
   the distance between said abuttable surfaces of said casing lugs being substantially equal to the distance between abuttable surfaces of said shroud lugs at a preselected operating temperature, and substantially all shroud stop lugs in contact with a casing stop lug when said shroud expands and is circumferentially guided.

2. A stator construction as in claim 1:
   said casing section having a second circumferentially running axially extending upstream facing casing slot, said second casing slot located upstream of said casing slot, and having a plurality of circumferentially spaced inwardly radially extending second casing stop lugs;
   a second partial-circular shroud ring of said second higher alpha material in which a plurality of stator vanes are positioned, having a circumferentially running axially extending second tongue slideably fit within said second casing slot, and a plurality of circumferentially spaced outwardly radially extending second shroud stop lugs splined with said second casing stop lugs;
   said second casing stop lugs and said second shroud lugs having mutually abuttable surfaces, the distance between abuttable surfaces of said second casing stop lugs being greater than the distances between abuttable surfaces of said second shroud lugs at room temperature; and
   the distance between the abuttable surfaces of said second casing lugs being substantially equal to the distance between abuttable surface of second shroud lugs at a preselected operating temperature.

3. A stator construction as in claim 1:
   said casing section also having an additional circumferentially running axially extending upstream facing lock casing slot, and an axially spaced circumferentially running axially extending downstream facing lock casing slot; and
   a lock ring having upstream and downstream facing lock tongues slideably extending within said lock casing slots, and having a downstream facing surface in abutment with an adjacent shroud ring.

4. A stator construction as in claim 1:

said shroud tongue being segmented with segments sized to fit between said casing stop lugs during assembly.

5. A stator construction as in claim 4:

a wire retainer between said shroud tongue and said casing stop lugs.

6. A stator construction as in claim 5:

said shroud ring being substantially semicircular.

7. A stator construction as in claim 6:

said casing section also having an additional circumferentially running axially extending upstream facing lock casing slot, and an axially spaced circumferentially running axially extending downstream facing lock casing slot; and a lock ring having upstream and downstream facing lock tongues slideably extending within said lock casing slots, and having a downstream facing surface in abutment with an adjacent shroud ring.

8. A stator construction as in claim 1:

said shroud ring being substantially semicircular.

9. A stator construction as in claim 2:

said shroud tongues being segmented with segments sized to fit between said casing stop lugs during assembly.

10. A stator construction as in claim 9:

said casing section also having an additional circumferentially running axially extending upstream facing lock casing slot, and an axially spaced circumferentially running axially extending downstream facing lock casing slot; and a lock ring having upstream and downstream facing lock tongues slideably extending within said lock casing slots, and having a downstream facing surface in abutment with an adjacent shroud ring.

* * * * *

UNITED STATES PATENT AND TRADEMARK OFFICE
CERTIFICATE OF CORRECTION

PATENT NO. : 5,004,402

DATED : April 2, 1991

INVENTOR(S) : H. L. Burchette et al

It is certified that error appears in the above-identified patent and that said Letters Patent is hereby corrected as shown below: On the Title page Column 1, after the title, insert the following paragraph:

-- The Government has rights in this invention pursuant to a contract awarded by the Department of the Air Force.--

In the Abstract, line 10, change "distance" to --distances--

Signed and Sealed this

Fifteenth Day of December, 1992

Attest:

DOUGLAS B. COMER

*Attesting Officer*     *Acting Commissioner of Patents and Trademarks*